US007889516B2

(12) United States Patent
McDowell et al.

(10) Patent No.: US 7,889,516 B2
(45) Date of Patent: Feb. 15, 2011

(54) CABLE MANAGEMENT SYSTEM WITH INSPECTION WINDOW

(75) Inventors: Darrel L. McDowell, Dardenne Prairie, MO (US); Melbourne F. Ervin, Pevely, MO (US)

(73) Assignee: AT&T Intellectual Property I, L.P., Reno, NV (US)

( * ) Notice: Subject to any disclaimer, the term of this patent is extended or adjusted under 35 U.S.C. 154(b) by 854 days.

(21) Appl. No.: 11/752,041

(22) Filed: May 22, 2007

(65) Prior Publication Data
US 2008/0291656 A1 Nov. 27, 2008

(51) Int. Cl.
*H02B 1/26* (2006.01)
(52) U.S. Cl. ........................................ 361/826; 361/827
(58) Field of Classification Search .................. 361/823, 361/824, 822, 826, 827, 829, 832, 833
See application file for complete search history.

(56) References Cited

U.S. PATENT DOCUMENTS

| | | | | |
|---|---|---|---|---|
| 4,037,910 | A | * | 7/1977 | Paluch ........................ 439/189 |
| 5,393,249 | A | | 2/1995 | Morgenstern et al. |
| 5,483,409 | A | * | 1/1996 | Heidorn et al. ............. 361/119 |
| 6,019,677 | A | | 2/2000 | Demster |
| 6,318,680 | B1 | | 11/2001 | Benedict et al. |
| 6,429,376 | B1 | | 8/2002 | Mendoza |
| 6,707,688 | B2 | * | 3/2004 | Reyes et al. ................. 361/824 |
| 6,769,551 | B2 | | 8/2004 | Rafferty et al. |
| 6,796,438 | B2 | | 9/2004 | Mendoza |
| 6,823,063 | B2 | | 11/2004 | Mendoza |
| 6,902,069 | B2 | | 6/2005 | Hartman et al. |
| 6,983,095 | B2 | | 1/2006 | Reagan et al. |
| 7,095,844 | B2 | | 8/2006 | Baker et al. |
| 7,136,566 | B2 | | 11/2006 | Weinert et al. |
| 7,495,932 | B2 | * | 2/2009 | Reyes et al. ................. 361/824 |
| 2006/0294561 | A1 | | 12/2006 | Grannan et al. |

OTHER PUBLICATIONS http://www.switchcraft.com/products/jpandj-194.html, Rear Cross-Connect Hardwired 84 Circuit DSX.
Digital Signal Cross-Connected (DSX-3) Rear Cross-Connect System, RZX-3 Product Catalog, Sep. 2000, ADC Telecommunications, Inc.
DSXi Cross-Connect Panel Installation Instructions, ADCP-80-535, Issue 1, Jan. 2002, ADC Telecommunications, Inc.
T1 Network Technology, Essentials for Successful Field Service Technicians, www.tektronix.com/mobile, 2002, Tektronix.

* cited by examiner

*Primary Examiner*—Dameon E Levi
(74) *Attorney, Agent, or Firm*—Jackson Walker L.L.P.

(57) ABSTRACT

A cable management system with an inspection window allows a technician to see available ports in a telecommunications module. The cable management systems inspection window is substantially transparent to permit visual access to underlying ports and associated electrical connectors. The inspection window is solid to prevent physical access to the electrical connectors, thereby preventing contamination, short-circuiting or other damage. The visual access permitted by an inspection window prevents the need to remove a cable trough to find available ports, which reduces the chance of causing a disruption in service by inadvertently disconnecting a cable that is in or around the cable trough.

17 Claims, 2 Drawing Sheets

CABLE MANAGEMENT SYSTEM WITH INSPECTION WINDOW

BACKGROUND

1. Field of the Invention

The present disclosure relates to cable management systems, and more particularly, to cable management systems that may be utilized in the telecommunications industry to organize cables feeding a digital cross-connect system (DSX).

2. Description of Related Art

A DSX provides a location for interconnecting elements in a telecommunications network and, more specifically, interconnecting Digital Signal 1 (DS1) circuits. A DSX may contain a large number of termination points. Connecting to a large number of termination points requires a large number of conductors, which often results in a high concentration of electrical conductors installed near a DSX. Cable management systems are often used to organize the conductors.

In some cases, cable management systems such as jumper troughs are installed over termination points. Installing jumper troughs over termination points obstructs physical and visual access to the termination points. If a technician is searching for an available termination point, the technician may have to temporarily relocate a jumper trough to determine visually whether an available termination point is located beneath the jumper trough. When a jumper trough is temporarily relocated in this way, there is a risk that a jumper could become accidentally disconnected. Such an accidental disconnection of a jumper could result in disruption of service to a user of the telecommunications network. A cable management system is needed that allows visual inspection of underlying termination points without the removal of jumper troughs.

SUMMARY

In a particular embodiment, a cable management trough includes an inspection window for viewing a row of connectors in the telecommunications module. The cable management trough has a front wall, a back wall, and a bottom wall. The front wall has a top edge and a bottom edge. The bottom edge of the front wall is connected to the front edge of the bottom wall. The back wall has a top edge and a bottom edge. The back wall's bottom edge is connected to the bottom wall's back edge.

In another embodiment, a cable management system suitable for mounting in close proximity to a row of connectors along the back plane of a telecommunications module is disclosed. The cable management system includes a jumper trough having a front wall, a bottom, and a rear wall. The bottom is attached to and substantially perpendicular to the front wall and the rear wall. The jumper trough is mounted along and substantially parallel to the back plane. The rear wall includes an inspection window wide enough to permit viewing a plurality of the row of connectors.

In still another embodiment, a cable management system is provided. The cable management system includes a trough. The trough includes a mounting wall with an inspection window for viewing a row of connectors. The inspection window is made of a solid material to prevent ready physical access to the row of connectors. The inspection window is made of a translucent material to allow light to reflect away from the connectors and through the inspection window. The trough includes a first outer wall and a bottom. The bottom is connected to the first outer wall and the mounting wall.

DESCRIPTION OF THE EMBODIMENT(S)

Figure 1:
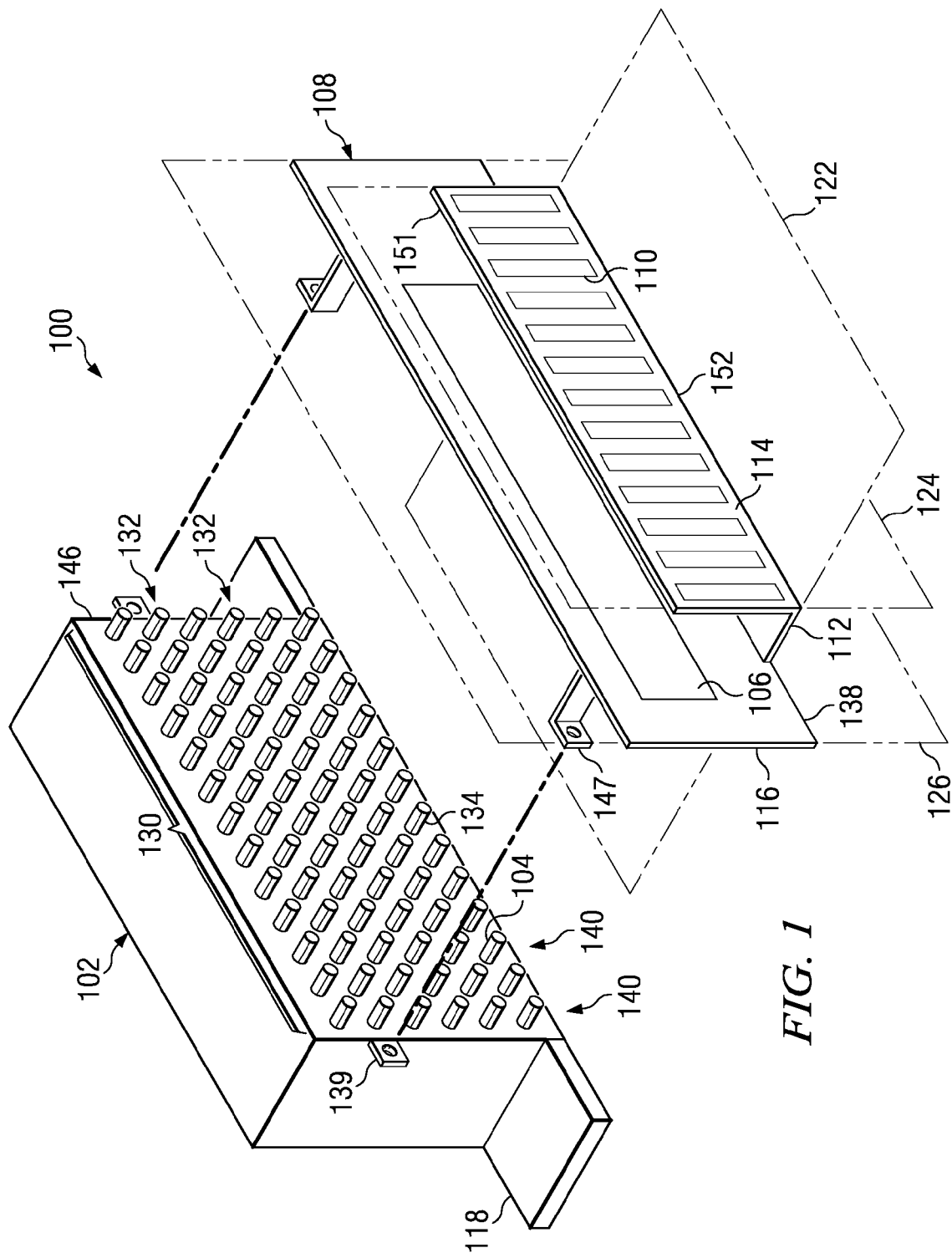
FIG. 1 depicts an embodiment cable management system including a cable trough with an inspection window for viewing available ports in a telecommunications module having a plurality of ports

FIG. 1 illustrates an embodiment cable management system 100. In some embodiments, cable management system 100 includes a telecommunications module 102 and a cable management trough 108. Cable management trough 108 could be any jumper trough, cable trough, or other such trough capable of housing or carrying conductors (not shown). Cable management trough 108 and cable ring 118 provide for organization of cables (not shown) that feed telecommunications module 102. Telecommunications module 102 is representative of a component that facilitates interconnection among other components in a telecommunications network. Telecommunications module 102 encompasses, for example, a DSX for interconnecting DS1 circuits. As shown in FIG. 1, telecommunications module 102 includes an array 130 of connectors such as connector 104 on back plane 146. In at least some embodiments, connector 104 and the other connectors in connector array 130 are wire wrap connectors for making hard-wired connectors. Connector array 130 includes connector rows 132 and connector columns 140. In some embodiments, each connector column 140 corresponds to a single telecommunication port such as port 134. The number of connector rows 132 defines the number of connections that may be made to a port such as port 134 while the number of columns 140 defines the number of ports. As depicted in FIG. 1, thirteen telecommunications ports are formed by connector columns 140 positioned across the width of back plane 146. Telecommunications module 102 may include elements of commercially distributed telecommunications components including, for example, the DI-G2CU1 DSX from ADC.

The illustrated embodiment of cable management trough 108 includes front wall 114 having a top edge 151 and a bottom edge 152, bottom wall 112, and back wall 116 having a bottom edge 138. In the depicted implementation, bottom wall 112 lies in a first plane 122, front wall 114 lies in a second plane 124 that is substantially perpendicular to first plane 122. Back wall 116 lies in a third plane 126 that is substantially parallel to second plane 124.

Cable management trough 108 is suitable for mounting in close proximity to telecommunications module 102; however for clarity, cable management trough 108 is illustrated in FIG. 1 in an un-mounted state. As illustrated in FIG. 1, mounting tab 147 is typical of two such tabs for mounting cable management trough 108 to telecommunications module 102. In the depicted embodiment, screws, bolts, rivets or other such hardware (not shown), could be used for connecting tab 139 on telecommunications module 102 to mounting tab 147, thereby mounting cable management trough 108.

In some embodiments, cable management trough 108 defines or includes one or more inspection windows 106. The implementation of cable management trough 108 shown in FIG. 1, for example, includes a single inspection window 106 in rear wall 116. Inspection window 106 is preferably sized and positioned within cable management trough 108 to facilitate visual access to telecommunications module 102. Still more preferably, inspection window 106 is located and sized to provide visual access to at least one row 132 of at least one column 140 of connector array 130 when telecommunications module 102 is attached, connected, or positioned proximate to cable management trough 108. In order to view substantially all of a row 132 of connector array 130, the length of inspection window 106 is preferably at least half the length of back wall 116. Having an inspection window 106 long enough to view each connector such as connector 104 in a row 132 provides a technician the ability to determine whether a port is available for connection. In the depicted implementation in FIG. 1, back wall 116 is wider than front wall 114, to allow for a longer inspection window 106 than would be possible if back wall 116 were the same width as front wall 114.

To prevent possible damage to telecommunications module 102, in some embodiments, inspection window 106 is made of a solid, transparent material such as acrylic or polycarbonate. Inspection window 106, when made of such material, would tend to be relatively light-weight and would help prevent physical damage to portions of telecommunications module 102, while still allowing visual access. In addition, an inspection window 106 made of a material such as acrylic or polycarbonate could prevent inadvertent short circuiting by foreign objects of two adjacent connectors in back plane 146.

As shown in FIG. 1, cable management trough 108 includes an optional circuit identifier label 110. In some embodiments, when cable management trough 108 is installed or otherwise positioned in proximity to telecommunications module 102, circuit identifier label 110 contains an identifier for the particular port seen through inspection window 106. In this way, inspection window 106 provides a technician visual access to connectors such as connector 104, and identifier label 110 provides a reference used to identify the port associated with the connector.

If a technician is looking for a spare port, inspection window 106 is wide enough to provide the technician visual access to a plurality of connectors 104 in connector array 130 in telecommunications module 102. In many cases, an inspection window such as inspection window 106 need only provide the technician visual access to a single horizontal row 132 of connectors to establish whether an underlying port 140 is available. This is because often each vertical column 134 in telecommunications module 102 is associated with a single port 140, such as the case with the depicted telecommunications module 102. Accordingly, if a technician is looking for available ports 140, visual access to a single horizontal row 132 of a particular port 140 provides the technician enough information to determine whether any circuits or other wires are connected to the port. In this way, a technician can utilize inspection window 106 to find available ports 140 in telecommunications module 102 while cable management trough 108 is installed in close proximity to telecommunications module 102. Therefore, the inclusion of window 106 in telecommunication module 102 beneficially prevents the technician from having to remove cable management trough 108 to determine whether any ports 140 are available. Reducing the number of instances that cable management trough 108 is removed from telecommunications module 102 lessens the likelihood that any jumpers (not shown) or other conductors (not shown) are disconnected during such an operation. In turn, this reduces the likelihood that a user or customer will have a disruption of service.

Figure 2:
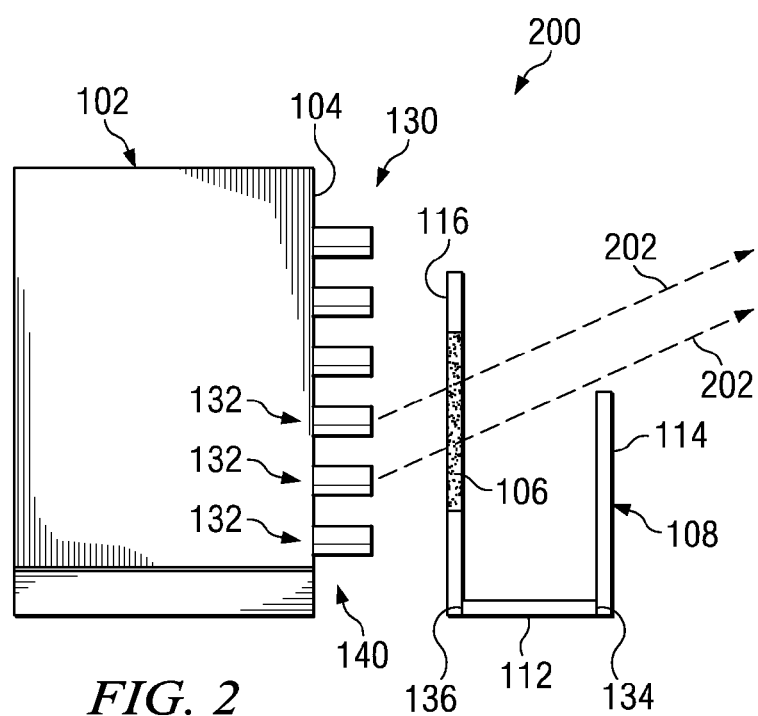
FIG. 2 illustrates an end view of the cable management system of FIG. 1.

FIG. 2 illustrates an end view of the embodied cable management system 100 shown in FIG. 1. In contrast to FIG. 1, end view 200 (FIG. 2) illustrates cable management trough 108 installed or otherwise positioned in close proximity to connection array 130 in telecommunications module 102. View 200 depicts front edge 134 of bottom wall 112 connected to bottom edge 152 (FIG. 1) of front wall 114. Similarly, view 200 depicts back edge 136 of bottom wall 112 connected to bottom edge 138 (FIG. 1) of back wall 116. Item 202 represents light reflecting from connector 104 in connector array 130 of telecommunications module 102. As shown, light 202 illuminates at least one row 132 of connector array 130 through the inspection window 106. Such light provides the technician visual access to at least one connector such as connector 104 in telecommunication module 102's connector array 130.

Figure 3:
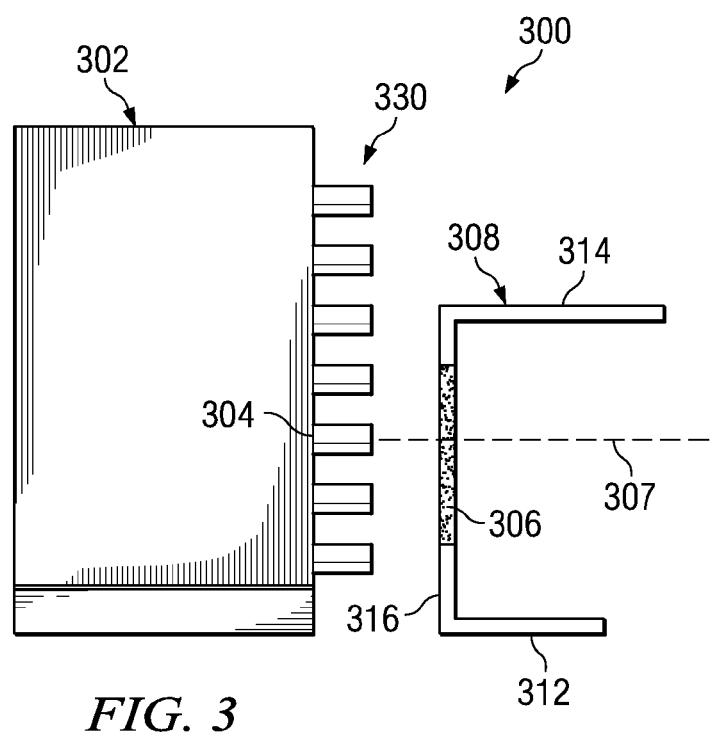
FIG. 3 depicts an alternate embodiment of a cable trough having a top wall and an inspection window in a vertical wall.

FIG. 3 depicts an alternate embodiment of system 100 in which a cable trough 308 is part of a cable management system positioned in proximity to telecommunications module 302. As depicted in FIG. 3, telecommunications module 302 includes connector array 330 including connector 304. With cable trough 308 installed in proximity to telecommunications module 302, connector 304 is visible by light 307 passing through inspection window 306. Inspection window 306 could be made of any solid, transparent material such as polycarbonate or acrylic. Cable trough 308 also includes top wall 314 and bottom wall 312. Inspection window 306, as shown, is located in vertical wall 316. Vertical wall 316, in the depicted embodiment, is a mounting wall for positioning cable trough 308 proximate to telecommunications module 320. For example, with appropriate hardware (not shown), cable trough 308 could be mounted proximate to telecommunications module using tabs (not shown) such as mounting tab 147 (FIG. 1) and tab 139 (FIG. 1). In the depicted embodiment, top wall 314 is connected to vertical wall 316 above bottom wall 312. As shown, top wall 314 is an outer wall that is substantially parallel to bottom wall 312. In addition, top wall 314 is substantially perpendicular to vertical wall 316.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A cable management trough comprising:
   a first wall having a front edge and a back edge, wherein the first wall is in a first plane; a second wall having a top edge and a bottom edge, wherein the second wall's bottom edge is connected to the first wall's front edge and wherein the second wall is in a second plane, wherein the first and second planes are substantially perpendicular; a third wall having a top edge and a bottom edge, wherein the third wall's bottom edge is connected to the second wall's back edge and wherein the third wall is in a third plane, wherein the second and third planes are substantially parallel; wherein at least one of the first wall and the third wall defines a window void; and an inspection window, occupying the window void, for viewing a connector row comprising a plurality of connectors in a telecommunications module, wherein the inspection window is made of solid and substantially transparent material; wherein the third wall has a first length, wherein the inspection window has a second length, wherein the first length is less than twice as long as the second length to permit viewing of substantially all of the connectors in the connector row.

2. The cable management trough of claim 1, wherein the inspection window is in the third wall.

3. The cable management trough of claim 2, wherein the connectors are wire-wrap connectors.

4. The cable management trough of claim 2, wherein the telecommunications module is a Digital Signal 1 cross-connect module.

5. The cable management trough of claim 1, wherein the inspection window contains acrylic.

6. The cable management trough of claim 1, wherein the inspection window is in the first wall.

7. A cable management system suitable for mounting in close proximity to a plurality of connectors in a row along a back plane of a telecommunications module, the cable management system comprising:
   a jumper trough including: a front wall in a front plane; and
   a bottom in a bottom plane, the bottom attached to and substantially perpendicular to the front wall, the bottom attached to and substantially perpendicular to a rear wall in a rear plane, the jumper trough mounted along and substantially parallel to the back plane, the rear wall defining a window void including a solid and substantially transparent inspection window occupying the window void, the inspection window being wide enough to permit viewing substantially all of the connectors in the row;
   wherein the rear wall has a bottom length, wherein the inspection window has a window length, wherein the bottom length is less than twice as long as the window length to permit viewing of substantially all of the connectors in the connector row.

8. The cable management system of claim 7, wherein the inspection window comprises substantially transparent, solid material.

9. The cable management system of claim 7, wherein the connectors are wire-wrap connectors.

10. The cable management system of claim 7, wherein the front wall has a first width and the rear wall has a second width, the first width less than the second width.

11. The cable management system of claim 7, wherein the telecommunications module is a DS1 cross connect module.

12. A cable management system comprising:
    a trough, the trough including:
    a mounting wall in a first plane, the mounting wall defining a window void, the window void encircling an inspection window for viewing a plurality of connectors in a row, the inspection window made of substantially transparent, solid material;
    a first outer wall, the first outer wall connected to the mounting wall; and
    a bottom, the bottom connected to the mounting wall;
    wherein the first outer wall is mounted above the bottom, wherein the first outer wall and the bottom are substantially parallel, wherein the first outer wall and the mounting wall are substantially parallel; and wherein the mounting wall has a first length, wherein the inspection window has a second length, wherein the first length is less than twice as long as the second length to permit viewing of substantially all of the connectors in the connector row.

13. The cable management system of claim 12, wherein the mounting wall is wider than the first outer wall.

14. The cable management system of claim 12, further comprising a plurality of mounting tabs coupled to the mounting wall, the plurality of mounting tabs for connecting the cable management system to a DS1 telecommunications module.

15. The cable management system of claim 14, wherein the DS1 telecommunications module has a first width, wherein the mounting wall has a second width, wherein the first width is substantially equal to the second width.

16. The cable management system of claim 12, wherein the connectors are wire-wrap connectors.

17. The cable management system of claim 14, wherein the cable management system is removably connected to the DS1 telecommunications module to allow ready access to the connectors in the row.

* * * * *